(12) United States Patent
Kondo

(10) Patent No.: US 10,158,317 B2
(45) Date of Patent: Dec. 18, 2018

(54) CONTROL APPARATUS FOR AC MOTOR

(71) Applicant: DENSO CORPORATION, Kariya, Aichi-pref. (JP)

(72) Inventor: Taizo Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 15/590,072

(22) Filed: May 9, 2017

(65) Prior Publication Data

US 2017/0331410 A1 Nov. 16, 2017

(30) Foreign Application Priority Data

May 10, 2016 (JP) .................................. 2016-094519

(51) Int. Cl.
| | |
|---|---|
| *H02P 27/08* | (2006.01) |
| *H02P 21/18* | (2016.01) |
| *H02P 21/26* | (2016.01) |
| *H02P 6/08* | (2016.01) |
| *H02P 21/00* | (2016.01) |
| *H02P 25/18* | (2006.01) |

(52) U.S. Cl.
CPC .............. *H02P 27/085* (2013.01); *H02P 6/08* (2013.01); *H02P 21/0021* (2013.01); *H02P 21/18* (2016.02); *H02P 21/26* (2016.02); *H02P 25/18* (2013.01)

(58) Field of Classification Search
CPC .................................................. H02P 27/085
USPC ........................................ 318/400.3, 400.01
See application file for complete search history.

(56) References Cited

U.S. PATENT DOCUMENTS 8,258,735 B2 * 9/2012 Kitanaka ............... B60L 15/025
318/400.02
2011/0043149 A1 2/2011 Kitanaka

FOREIGN PATENT DOCUMENTS

JP 5510444 B2 6/2014

OTHER PUBLICATIONS

"Institute of Electrical Engineers of Japan, semiconductor voltage switching," Power Electornics Circuit, Nov. 30, 2000, pp. 166-167, First Edition.

\* cited by examiner

*Primary Examiner* — David S Luo
(74) *Attorney, Agent, or Firm* — Oliff PLC

(57) ABSTRACT

In a control apparatus for an alternating current (AC) motor, a control mode switching determiner compares a modulation rate with a modulation rate threshold, and selects between a synchronous control mode to perform synchronous control in a range where the modulation rate is equal to or greater than a modulation rate threshold and an asynchronous control mode to perform asynchronous control in a range where the modulation rate is less than the modulation rate threshold. The control mode switching determiner uses a different modulation rate threshold in a low rotational speed range and a high rotational speed range such that the modulation rate threshold in the low rotational speed range is greater than the modulation rate threshold in the high rotational speed range. A selector selects between outputting the synchronous pulse signal and outputting the asynchronous pulse signal.

10 Claims, 17 Drawing Sheets

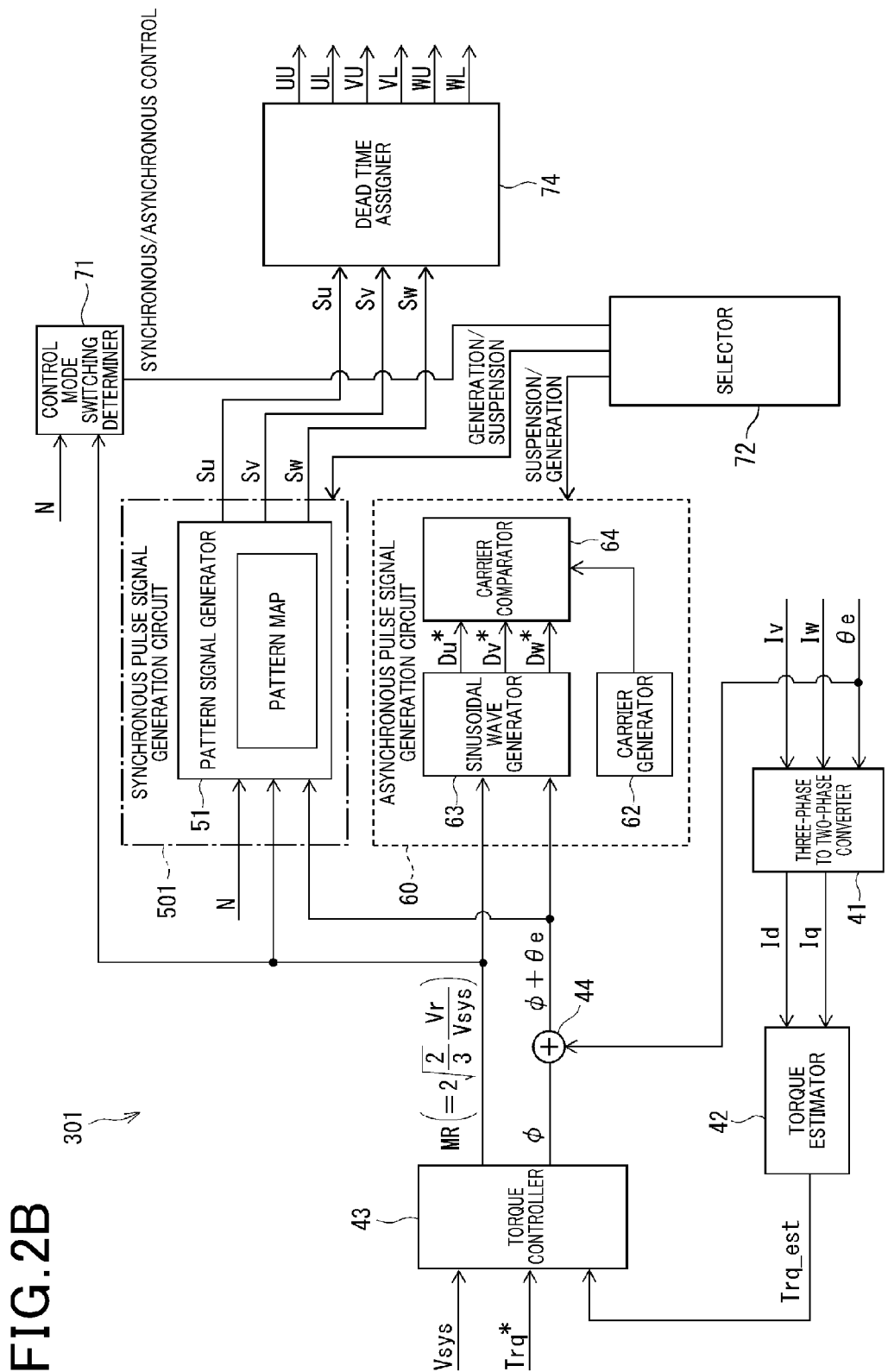

HIGH ROTATIONAL SPEED (NUMBER OF PULSES: n = 5)

⇩ SYNCHRONOUS CONTROL

LOW ROTATIONAL SPEED (NUMBER OF PULSES: n = 5)

⇩ NUMBER OF PULSES IS INCREASED TO ENSURE CONTROLLABILITY
→INCREASE IN PROCESSING LOAD

LOW ROTATIONAL SPEED
(INCREASE IN NUMBER OF PULSES: n = 5 → 9)

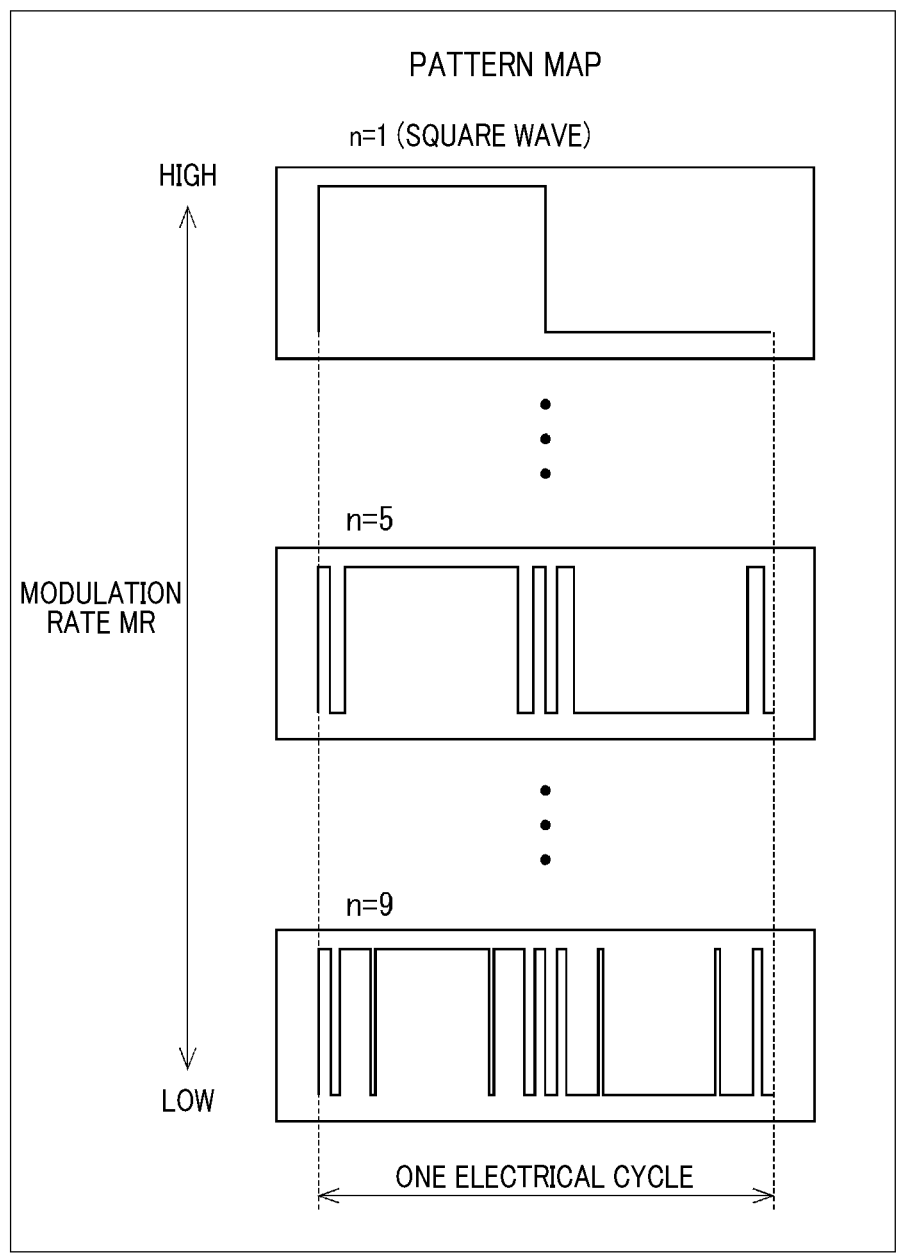

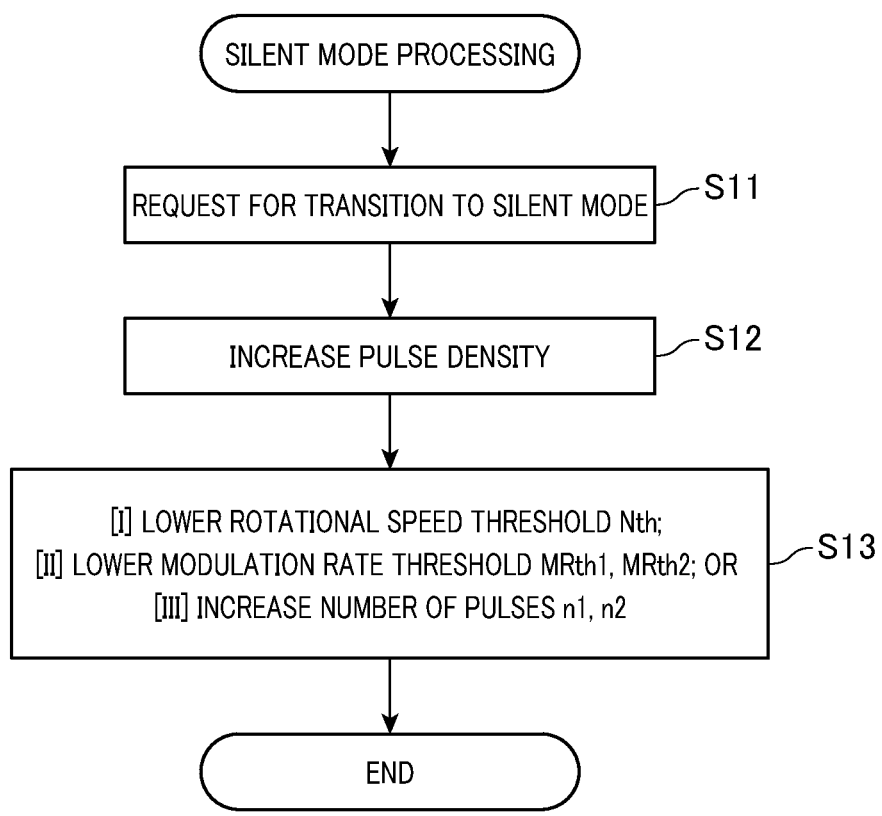

CONTROL APPARATUS FOR AC MOTOR

CROSS-REFERENCE TO RELATED APPLICATION

This application is based on and claims the benefit of priority from earlier Japanese Patent Application No. 2016-94519 filed May 10, 2016, the descriptions of which are incorporated herein by reference.

TECHNICAL FIELD

The present invention relates to an apparatus for controlling energization of an alternating current (AC) motor by driving an inverter.

RELATED ART

Conventionally, a controller for driving an inverter to output a pulsed voltage to an AC motor is known which selects between inverter drive signal generation modes depending on an operating condition.

For example, a control apparatus for a rotary machine, disclosed in Japanese Patent No. 5510444, is operative to select between control to generate an operation signal that is synchronized with an electrical angle and control to generate a PWM signal, depending on the voltage utilization. The voltage utilization multiplied by a proportionality factor is read as a modulation rate. The operation signal that is synchronized with the electrical angle is a so called pulse pattern signal that is stored for each modulation rate as map data.

Another technique is known such that, regarding carrier frequencies in the PWM control, synchronous modulation is employed in a high output fundamental frequency range (i.e., a high rotational speed range of the AC motor) and asynchronous modulation is employed in a low output fundamental frequency range (i.e., a low rotational speed range of the AC motor) (see an article entitled "Power Electronics Circuit", Semiconductor Power Conversion System Investigation Expert Committee of the Institute of Electrical Engineers of Japan (IEEJ), Nov. 30, 2000, pp. 166-167).

In asynchronous control for driving the inverter with an asynchronous pulse signal, actual pulses are unstable, which leads to phase current disturbance and increased torque vibration and noise of the AC motor. For example, in a drive system for a motor generator used as a source of power of a hybrid vehicle, vehicle vibration and noise may be deteriorated, which may lead to deterioration in merchantability.

In contrast, in synchronous control for driving the inverter with a synchronous pulse signal, actual pulses are stable with respect to the electrical angle, which can reduce the vehicle vibration and noise. However, unfortunately, increasing the number of pulses in one electrical cycle (hereinafter also referred to as the per-cycle number of pulses) to ensure controllability in a lower rotational speed range may increase the processing load.

Therefore, the asynchronous control range and the synchronous control range are required to be separated properly.

The conventional technique disclosed in Japanese Patent No. 5510444, under assumption that the PWM signal is an asynchronous pulse signal that is not synchronized with the electrical angle, selects between the synchronous control with the synchronous pulse signal and the asynchronous control with the asynchronous pulse signal depending on the modulation rate. This technique is represented by a graph of modulation rate versus rotational speed in FIG. 15A and a graph of torque versus rotational speed in FIG. 15B.

FIG. 16A illustrates a relationship between the carrier frequency and the rotational speed of the conventional technique of the article entitled "Power Electronics Circuit" recited above. FIG. 16B illustrates a relationship between the number of pulses in one electrical cycle (or the per-cycle number of pulses) and the rotational speed estimated based on the relationship of FIG. 16A. In an asynchronous control range where the rotational speed is less than a threshold Nth as shown in FIG. 16B, the number of pulses n is increased with decreasing rotational speed N to ensure controllability.

In FIGS. 15A, 15B, and FIGS. 16A, 16B, the symbols N, Nth, MR, MRth denote the rotational speed, the rotational speed threshold, the modulation rate, and the modulation rate threshold, respectively.

Being combined with the findings of the article entitled "Power Electronics Circuit" recited above, as indicated by a solid line ellipse in FIG. 15A, preferably, the synchronous control is employed in a high rotational speed and high modulation rate range (HNHM) and the asynchronous control is employed in a low rotational speed and low modulation rate range (LNLM).

However, only from such conventional findings, one cannot determine how to set an optimal control mode in each of a low rotational speed and high modulation rate range (LNHM) and a high rotational speed and low modulation rate range (HNLM) respectively indicated by dashed-two dotted lines ellipse.

Therefore, to balance reducing the vibration and noise with suppressing an increase in the processing load over the whole range of the rotational speed and the modulation rate of the AC motor, further considerations are required about technical ideas other than those of Japanese Patent No. 5510444 and the article entitled "Power Electronics Circuit" recited above.

In consideration of the foregoing, exemplary embodiments of the present invention are directed to providing a control apparatus of an AC motor, capable of balancing reducing the vibration and noise with suppressing an increase in the processing load depending on the rotational speed and the modulation rate of the AC motor.

SUMMARY

In accordance with an exemplary embodiment of the present invention, there is provided a control apparatus for an alternating current (AC) motor, including an inverter, a controller, a synchronous pulse generation circuit, an asynchronous pulse generation circuit, a control mode switching determiner, and a selector.

The inverter is configured to convert direct current (DC) power input from a power source into alternating current (AC) power by driving a plurality of switching elements to supply the AC power to the AC motor.

The controller is configured to calculate a modulation rate that is a ratio of an amplitude of a voltage vector to an inverter voltage, and also calculate a phase of the voltage vector.

The synchronous pulse generation circuit is configured to generate a synchronous pulse signal synchronized with an electrical angle of the AC motor as a drive signal for driving the inverter depending on the modulation rate, the phase of the voltage vector, and the electrical angle of the AC motor.

The asynchronous pulse generation circuit is configured to generate an asynchronous pulse signal having a cycle independent of the signal electrical angle, as the drive signal.

The control mode switching determiner is configured to compare the modulation rate with a modulation rate threshold that is a positive value, and configured to select between a synchronous control mode to perform synchronous control in a range where the modulation rate is greater than the modulation rate threshold and an asynchronous control mode to perform asynchronous control in a range where the modulation rate is less than the modulation rate threshold.

The selector is configured to select between outputting the synchronous pulse signal and outputting the asynchronous pulse signal according to a result of determination by the control mode switching determiner.

The control mode switching determiner is further configured to use different values of the modulation rate threshold in a low rotational speed range and a high rotational speed range such that the modulation rate threshold in the low rotational speed range is greater than the modulation rate threshold in the high rotational speed range. The low rotational speed range is a rotational speed range in which an absolute value of a rotational speed of the AC motor is less than a rotational speed threshold that is a positive value. The high rotational speed range is a rotational speed range in which the absolute value of the rotational speed of the AC motor is equal to or greater than the rotational speed threshold.

It is worth noting that the modulation rate threshold and the rotational speed threshold are specified as being positive values. This is because, on the premise that the modulation rate and the rotational speed are defined as positive values, the modulation rate and the rotational speed are respectively compared with the modulation rate threshold and the rotational speed threshold. This is also because the cases where the modulation rate threshold or/and the rotational speed threshold is zero should be excluded. In the present invention, in each of the high and low rotational speed ranges, a range always exists where the modulation rate is less than the modulation rate threshold.

Unfortunately, in the low rotational speed range, increasing the per-cycle number of pulses to ensure controllability may lead to an increase in the processing load. However, in a range where the modulation rate takes a relatively large value, the number of pulses n can be decreased. Therefore, the modulation rate threshold is set to a larger value in the low rotational speed range than in the high rotational speed range, whereby the vibration and noise can be reduced by the synchronous control in part of the high modulation rate range while putting emphasis on the effect of the asynchronous control suppressing an increase in the processing load.

Meanwhile, the modulation rate threshold is set to a smaller value in the high rotational speed range than in the low rotational speed range, whereby the synchronous control range where the vibration and noise can be advantageously reduced can be extended as broadly as possible.

Thus, in the present embodiment, over the whole range of the rotational speed and the modulation rate of the AC motor, reducing the vibration and noise can be balanced with suppressing the increase in the processing load.

BRIEF DESCRIPTION OF THE DRAWINGS

FIG. 2B is a control block diagram of an inverter controller of a modification of the first embodiment;

FIG. 6 is an example of relationship between a modulation rate and the number of pulses according to a pattern map;

FIG. 13 is a flowchart of silent mode processing of the third embodiment;

DESCRIPTION OF SPECIFIC EMBODIMENTS

With reference to the accompanying drawings, hereinafter are described several embodiments of the present invention. Substantially common elements or steps throughout the embodiments are assigned the same numbers and will not be redundantly described. The embodiments are each referred to as the present embodiment in the following.

An AC motor control apparatus in accordance with the present embodiment controls energization of a motor generator (MG) that is a three-phase AC motor in a system that drives the MG as the motive power source of a hybrid electric vehicle or electric vehicle. The MG and the MG control apparatus of each embodiment correspond to the AC motor and the AC motor control apparatus.

System Configuration

Figure 1:
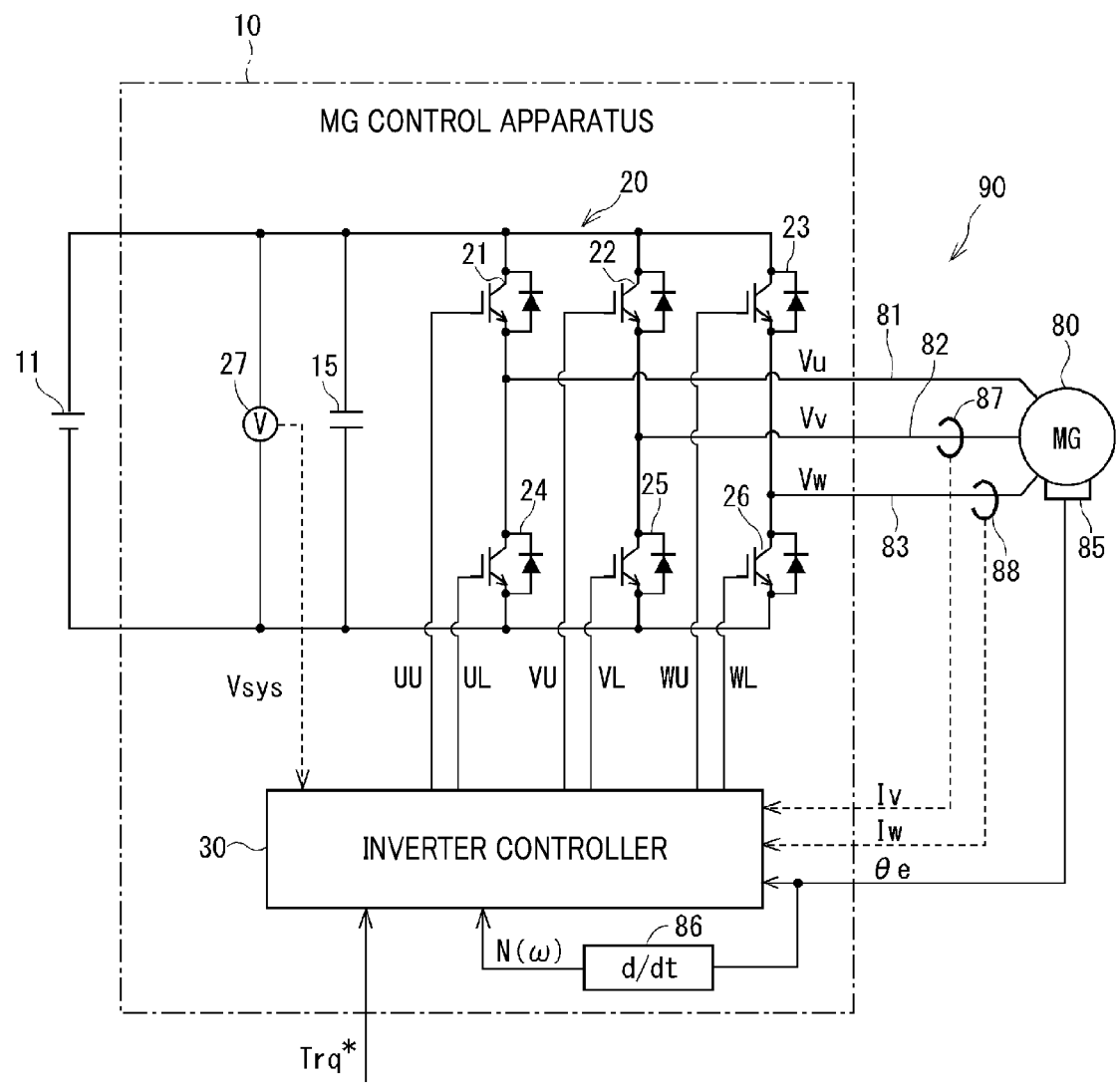
FIG. 1 is a schematic block diagram of a MG drive system to which an control apparatus for an AC motor is applied to, in accordance of each of first to third embodiments.

The overall configuration of a MG drive system to which the MG control apparatus of each of first to third embodiments is applied will be described with reference to FIG. 1. FIG. 1 illustrates a system including a single MG.

In the MG drive system 90, an inverter 20 converts direct current (DC) power of a battery 11, which is a rechargeable secondary battery used as a power source, to three-phase AC power which is in turn supplied to the MG 80. In the MG drive system 90, a MG control apparatus 10 mainly includes the inverter 20 and an inverter controller 30.

The MG control apparatus 10 may be similarly applied to an MG drive system containing a converter that boosts the voltage of the battery 11 and outputs the boosted voltage to the inverter 20. In addition, the MG control apparatus 10 may be similarly applied to an MG drive system containing two or more MGs.

The MG 80 is, for example, a permanent magnet synchronous three-phase AC motor. In the present embodiment, the MG 80 functions both as an electric motor for generating a torque for driving the drive wheels of a hybrid vehicle, and as a generator for recovering energy produced by a torque transmitted from the engine and the drive wheels.

Current sensors are respectively provided along the current paths of two out of the three phase windings 81, 82, 83 of the MG 80, for detecting the phase currents. In the example of FIG. 1, current sensors 87 and 88 for detecting the phase currents Iv and Iw are provided along the current paths connected to the V-phase winding 82 and the W-phase winding 83 respectively, and the remaining U-phase current Iu is estimated based on Kirchhoff's law. In other embodiments, any two or all of the three phase currents may be detected. Alternatively, a technique of estimating two of the three phase currents based on the detected value of the other one phase current may be employed.

The electrical angle θe of the MG 80 is detected by a rotation angle sensor 85, such as a resolver.

In the inverter 20, the six switching elements 21 to 26 of the upper and lower arms are connected in a bridge configuration. More specifically, the switching elements 21, 22, and 23 are the switching elements of the U-phase, V-phase, and W-phase upper arms respectively, and the switching elements 24, 25, and 26 are the switching elements of the U-phase, V-phase, and W-phase lower arms respectively. Each of the switching elements 21 to 26 may be an insulated gate bipolar transistor (IGBT) connected in parallel with a freewheeling diode which allows current to flow from the low-potential side to the high-potential side.

The inverter 20 converts DC power into three-phase AC power by operating the switching elements 21-26 in response to gate signals UU, UL, VU, VL, WU, WL from the inverter controller 30. Phase voltages Vu, Vv, Vw, corresponding to the voltage command calculated by the inverter controller 30, are applied to respective phase windings 81, 82, 83 of the MG 80. The smoothing capacitor 15 smoothens the system voltage Vsys that is inputted to the inverter 20. The system voltage Vsys corresponds to an inverter voltage.

The voltage sensor 27 detects the system voltage Vsys.

The inverter controller 30 is configured as a microcomputer or the like that incorporates therein a central processing unit (CPU) (not shown), a read-only memory (ROM) (not shown), a random access memory (RAM) (not shown), and an input-output interface (not shown), and a bus line (not shown) for interconnecting these components. The microcomputer executes software processing through execution of a previously stored program by the CPU, and through hardware processing control using dedicated circuitry.

The inverter controller 30 acquires the system voltage Vsys, the two phase currents Iv and Iw, and the electrical angle θe, detected by respective sensors. In addition, the inverter controller 30 acquires the value of electrical angular velocity w (degrees/second) from the differentiator 86, obtained by differentiating the electrical angle θe with respect to time. The electrical angular velocity ω is converted into a value of rotation speed N [rpm] by being multiplied by a proportionality constant.

It should be noted that the differentiator 86 may be provided within the inverter controller 30.

The inverter controller 30 also receives a torque command Trq* from a high-level control circuit.

Based on these items of information, the inverter controller 30 calculates the gate signals UU, UL, VU, VL, WU, WL for operating the respective switching elements 21-26 of the inverter 20. The inverter 20 operates the switching elements 21-26 in response to the gate signals UU, UL, VU, VL, WU, WL, thereby converting the DC power from the battery 11 into AC power, which is supplied to the MG 80.

Inverter Controller Configuration

The configuration of the inverter controller 30 of each of the first and second embodiments will now be described.

First Embodiment

The inverter controller 301 (identified with the inverter controller 30) of the first embodiment will be described with reference to FIG. 2A. In torque feedback control processing to be performed in the inverter controller 301, a torque estimate Trq_est that is estimated from values of dq-axis currents Id, Iq is fed back for a torque command value Trq*. A three-phase to two-phase converter 41 converts phase current sense values Iv, Iw into dq-axis current values Id, Iq based on an electrical angle θe. A torque estimator 42 calculates the torque estimate Trq_est based on the dq-axis current values Id, Iq and motor constants of the MG 80. In a system including a torque sensor provided for the MG 80, a torque sense value to be fed back to a torque controller 43 may be acquired without providing the torque estimator 42. The torque controller 43 corresponds to a controller.

The torque controller 43 calculates an amplitude Vr and a phase φ of a voltage vector for commanding the inverter 20 to cause the torque estimate Trq_est to follow the torque command value Trq* via the PI control or the like. The torque controller 43 further calculates a modulation rate command value MR according to the following equation (1) based on a ratio of a voltage amplitude command value Vr to a system voltage Vsys, that is a voltage utilization (see Japanese Patent No. 5510444):

$$MR=2\sqrt{(2/3)}\times(Vr/Vsys)\approx 1.63\times(Vr/Vsys) \quad (1)$$

For example, when the voltage utilization Vr/Vsys is 0.78, the modulation rate command value MR becomes 1.27.

The modulation rate command value MR and the voltage phase command value φ outputted from the torque controller 43 are hereinafter simply referred to as the modulation rate MR and the voltage phase φ, respectively. The phase angle calculator 44 calculates a phase angle φ+θe by adding the electrical angle θe to the voltage phase φ. The modulation rate MR and the phase angle φ+θe are acquired by the synchronous pulse signal generation circuit 501 and the asynchronous pulse signal generation circuit 60.

Figure 2A:
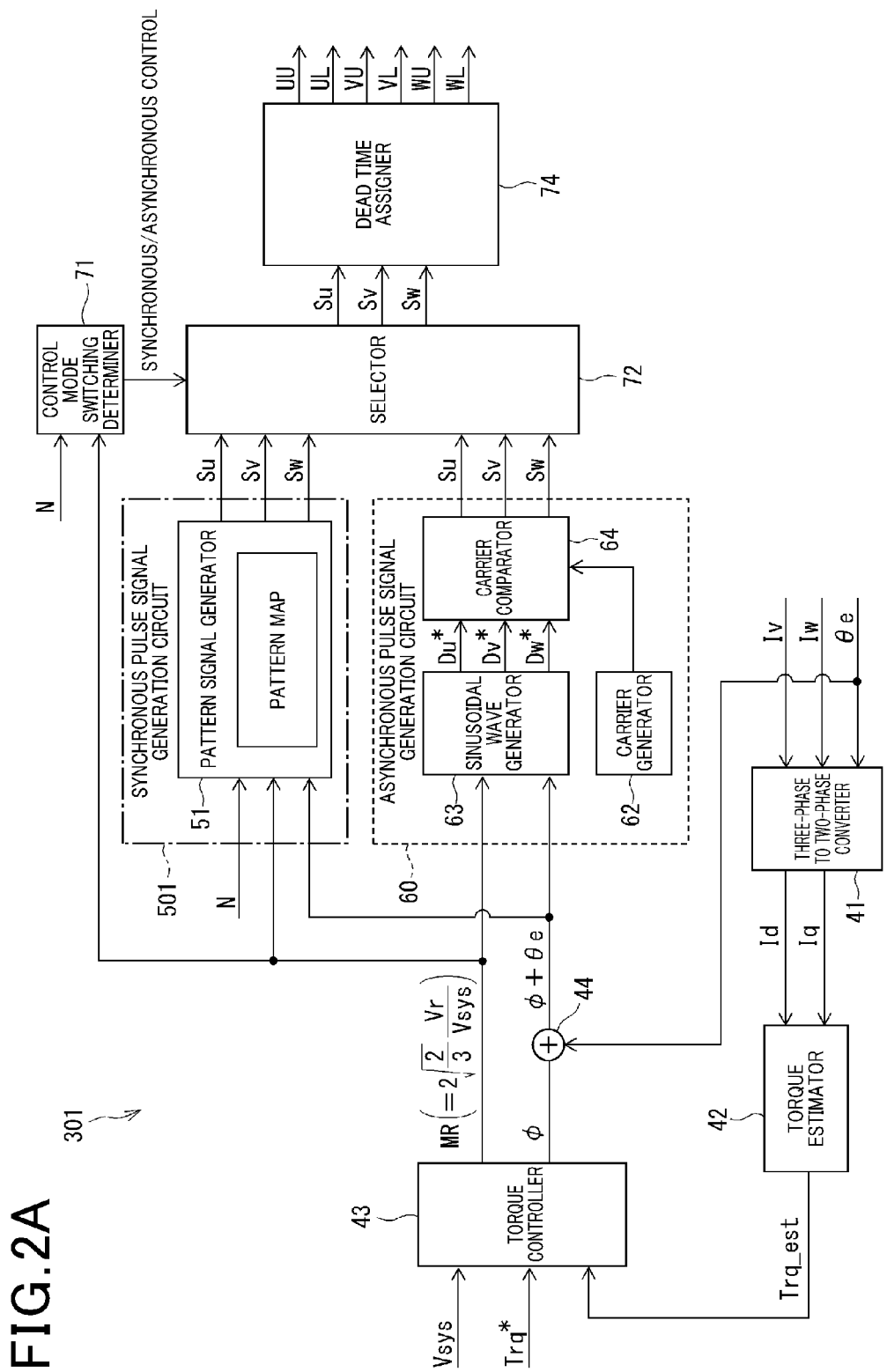
FIG. 2A is a control block diagram of an inverter controller of the first embodiment.

Alternatively to the torque feedback control configuration of FIG. 2A, another current feedback control configuration where the dq-axis current Id, Iq are fed back for the current command value Id*, Iq* may be employed. In such an alternative configuration, the inverter controller 301 may include a current controller as a controller. The torque feedback control and current feedback control are well-known technologies in the art of motor control. Therefore, detailed descriptions about them will not be provided.

The inverter controller 301 includes a synchronous pulse signal generation circuit 501 and an asynchronous pulse signal generation circuit 60, each of which is configured to generate drive signals Su, Sv, Sw to drive the inverter 20 in response to the modulation rate MR and the phase angle φ+θe. The synchronous pulse signal generation circuit 501 generates synchronous pulse signals synchronized with the electrical angle θe. The asynchronous pulse signal generation circuit 60 generates asynchronous pulse signals having a time period independent of the electrical angle θe.

In the following, synchronous control refers to control to drive the inverter 20 with the synchronous pulse signals generated by the synchronous pulse signal generation circuit 501, and asynchronous control refers to control to drive the inverter 20 with the asynchronous pulse signals generated by the asynchronous pulse signal generation circuit 60.

In the present embodiment, a pattern signal generator 51 selects one of a plurality of pulse patterns pre-stored in a pattern map. The synchronous pulse signal generation circuit 501 thereby generates a synchronous pulse signal according to the selected one of the plurality of pulse patterns. The pattern map stores pattern data that is data about the plurality of patterns synchronized with the electrical angle θe, one for each of modulation rates. The pattern data may be stored in the RAM or ROM of the microcomputer. Alternatively, the pattern data may be pre-stored in an external storage device, and the pattern signal generator 51 may acquire the pattern data from the external storage device via communications.

The pattern signal generator 51 acquires the modulation rate MR, the phase angle, φ+θe, and the rotational speed N of the MG 80. In the following descriptions, the rotational speed N is expressed as an absolute value. The pattern signal generator 51 searches for and sets an appropriate one of the plurality of pulse patterns stored in the pattern map, in response to the modulation rate MR. Alternatively, the number of pulses per electrical cycle may be set as a function of the rotational speed N. Loads for the pattern data search and setting processing performed in the pattern signal generator 51 increase as the number of pulses n increases. When the modulation rate MR is 1.27, the square wave pattern for the number of pulses n=1 is set.

The pattern signal generator 51 generates synchronous pulse signals based on the set pulse pattern and the phase angle, φ+θe.

The asynchronous pulse signal generation circuit 60 includes a carrier generator 62, a sinusoidal wave generator 63, and a carrier comparator 64.

The carrier generator 62 generates a carrier having a period independent of the electrical angle θe. Typically, a triangular wave is used as a carrier. In some alternative embodiments, a saw tooth wave may be used as a carrier.

The sinusoidal wave generator 63 generates sinusoidal phase voltage command values Du*, Dv*, Dw* based on the modulation rate MR and the phase angle, φ+θe.

The carrier comparator 64 generates asynchronous pulse signals via pulse width modulation (PWM) control in which the phase voltage command values Du*, Dv*, Dw* generated by the sinusoidal wave generator 63 and the carrier generated by the carrier generator 62 are compared in magnitude.

The inverter controller 301 further includes a control mode switching determiner 71 and a selector 72.

The control mode switching determiner 71 acquires the rotational speed N and the modulation rate MR of the MG 80, and based on them, selects between the synchronous control mode and the asynchronous control mode. More specifically, the control mode switching determiner 71 compares the modulation rate MR with a modulation rate threshold MRth that is a positive value. The control mode switching determiner 71 selects between the synchronous control mode and the asynchronous control mode such that the synchronous control is performed in a range where the modulation rate MR is equal to or greater than the modulation rate threshold MRth and the asynchronous control is performed in a range where the modulation rate MR is less than the modulation rate threshold MRth. How to deal with the rotational speed N will be described later.

The selector 72 selects whether to output the synchronous pulse signals or the asynchronous pulse signals according to a result of determination by the control mode switching determiner 71.

In the configuration shown in FIG. 2A, the selector 72 is just preceded by the synchronous pulse signal generation circuit 501 and the synchronous pulse signal generation circuit 60 to acquire drive signals Su, Sv, Sw generated by the pulse signal generation circuit 501 or 60. Based on the result of determination by the control mode switching determiner 71, the selector 72 selects the drive signals Su, Sv, Sw to be outputted to the dead time assigner 74. In such a configuration, the pulse signal generation circuits 501 and 60 generate the synchronous pulse signals and the asynchronous pulse signals, respectively, whether selected or not.

In some alternative embodiments, as shown in FIG. 2B, the selector 72 may be just followed by the synchronous pulse signal generation circuit 501 and the asynchronous pulse signal generation circuit 60 to select whether to generate the synchronous pulse signals via the synchronous pulse signal generation circuit 501 or the asynchronous pulse signals via the asynchronous pulse signal generation circuit 60, according to a result of determination by the control mode switching determiner 71. In such a configuration, one of the pulse signal generation circuits 501, 60 that is not selected by the selector 72 is allowed to suspend its pulse signal generation. The drive signals Su, Sv, Sw generated by the other one of the pulse signal generation circuits 501, 60 that is selected by the selector 72 will be outputted to the dead time assigner 74.

Figure 3:
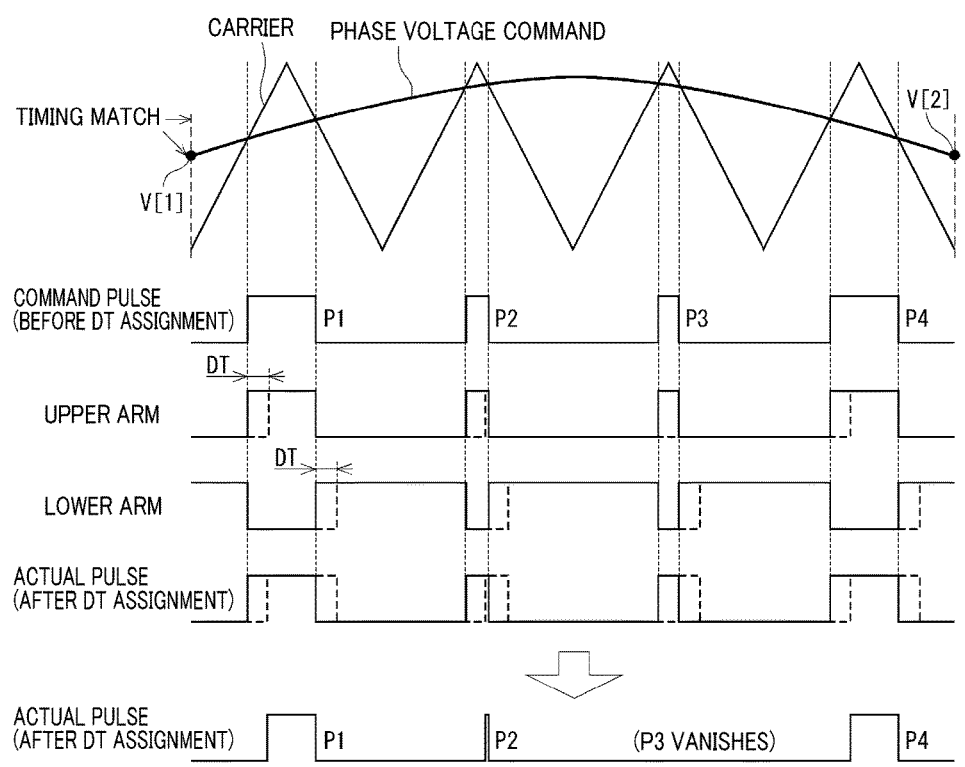
FIG. 3 is a timing chart illustrating actual-pulse disturbances in an asynchronous PWM control mode.
Figure 4:
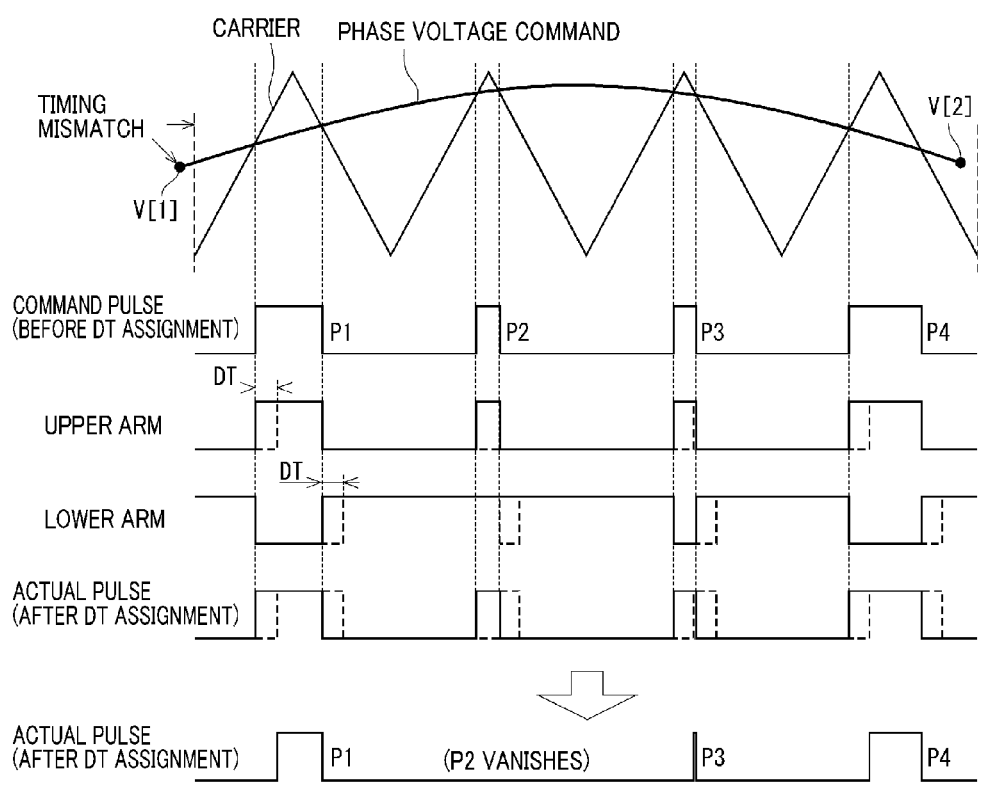
FIG. 4 is another timing chart illustrating actual-pulse disturbances in the asynchronous PWM control mode.

In the above configuration, the drive signals Su, Sv, Sw generated by the pulse signal generation circuits 501, 60 correspond to pre-DT assignment command pulses shown in FIGS. 3 and 4. The dead time assigner 74 generates actual pulses. In the DT assignment performed in the dead time assigner 74, the dead time (DT) is assigned to the drive signals Su, Sv, Sw so that both the switching elements of the upper and lower arms for each phase are simultaneously placed OFF during the dead time.

The dead time assigner 74 outputs gate signals UU, UL, VU, VL, WU, WL that corresponds to the actual pulses to the switching elements 21-26 of the upper and lower arms for the U-phase, V-phase, and W-phase of the inverter 20.

How the control mode switching determiner 71 selects the synchronous/asynchronous control mode in the inverter controller 301 configured as above will now be described.

Referring to FIGS. 3 and 4, a problem with the asynchronous control will be described. In the asynchronous PWM control, a phase difference between each of the phase voltage command values Du*, Dv*, Dw* generated based on the electrical angle θe and the carrier generated independent of the electrical angle θe progresses in an uncontrolled manner. Therefore, as shown in FIG. 3, arbitrary points V[1], V[2] of phase voltage command value may match the timing of the valley of the carrier while, as shown in FIG. 4, arbitrary points V[1], V[2] of phase voltage command value may drift from the timing of the valley of the carrier.

There is no significant change in waveform between the pre-DT assignment command pulses P1-P4 of FIG. 3 and the pre-DT assignment command pulses P1-P4 of FIG. 4 although, strictly, there are small differences in pulse position and pulse width between them. The pre-DT assignment command pulses P1-P4 are acquired from comparison between the phase voltage command value and the carrier.

However, with on timings of the upper- and lower arms delayed by the DT assignment, a pulse having a width less than the dead time DT will vanish as an actual pulse. For example, in the example of FIG. 3, the third pulse vanishes, and in the example of FIG. 4, the fourth pulse vanishes. Thus, different pulses vanish, which indicates that there is a remarkable change in actual-pulse waveform.

That is, in the asynchronous control, the relationship between the electrical angle θe and the command pulses is uncontrolled. Therefore, even with a fixed rotational speed N and a fixed modulation rate MR, the actual-pulse waveform may change with time. As a result, the phase currents from the inverter 20 to the MG 80 may be disturbed, which may deteriorate vibration and noise.

Meanwhile, in the synchronous control, the relationship between the electrical angle θe and the command pulses is fixed. Therefore, with a fixed rotational speed N and a fixed modulation rate MR, the actual-pulse waveform may be kept unchanged. This leads to stable phase currents from the inverter 20 to the MG 80, which can reduce the vibration and noise.

Figure 5A:
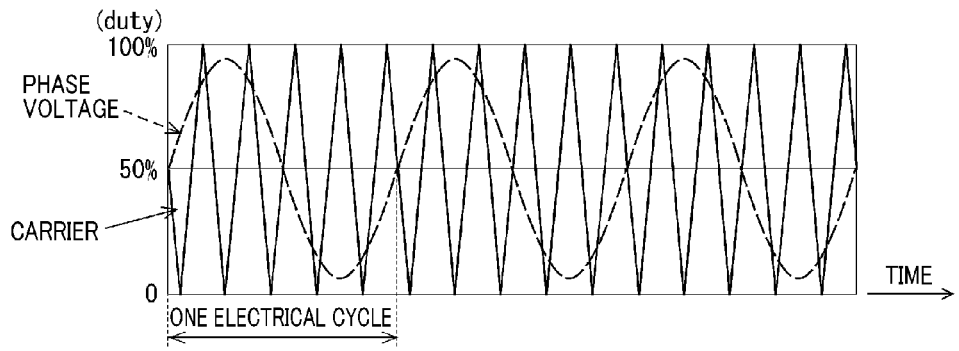
FIG. 5A is a diagram where the number of pulses is not increased in a high rotational speed range in a synchronous PWM control mode.
Figure 5B:
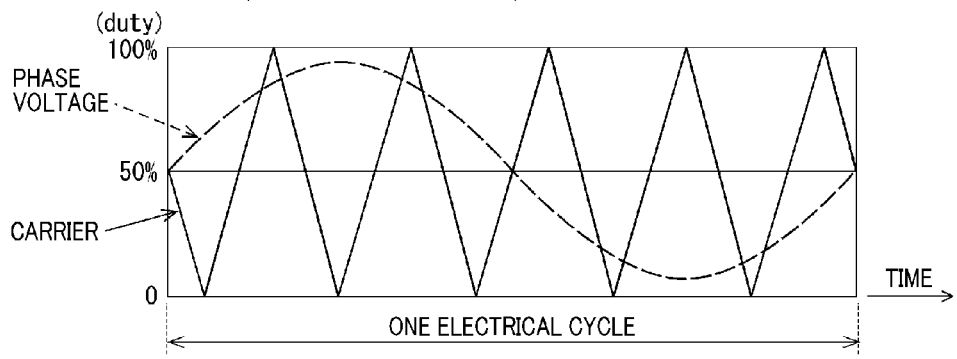
FIG. 5B is a diagram where the number of pulses is not increased in a low rotational speed range in the synchronous PWM control mode.
Figure 5C:
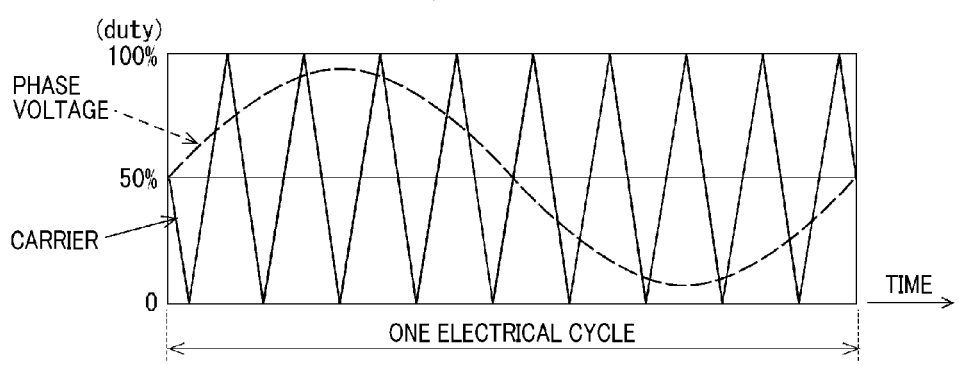
FIG. 5C is a diagram where the number of pulses is increased in the low rotational speed range in the synchronous PWM control mode.

There is also a problem with the synchronous control. Particularly, in a low rotational seed range, the processing load may increase. Referring to FIGS. 5A-5C with the same time axis scale, timings at which a phase voltage sinusoidal wave intersects the reference line of duty=50% coincide with timings at which the carrier intersects the reference line.

In an example of FIG. 5A, the carrier frequency is five times per electrical cycle at a high rotational speed. Since a maximum amplitude of the phase voltage is between 0% and 100% and thus not in overmodulation, the per-cycle number of pulses n is five that is equal to the carrier frequency. For an illustration purpose, it is assumed that the per-cycle number of pulses n is five although the number of pulses that is normally used is a much larger number.

FIG. 5B illustrates a case where the rotational speed N is reduced to one third of the high rotational speed N of FIG. 5A while keeping the per-cycle number of pulses n at five (i.e., n=5). In such a case, a pulse density that is the number of pulses per second decreases, so that an adverse effect such as an increase in ripple current may occur.

To reduce such an adverse effect, as shown in FIG. 5C, the per-cycle number of pulses n is increased from five to nine to increase the pulse density to a level at which controllability can be ensured. This can ensure controllability. However, the processing load for setting the command pulses will increase. Therefore, when the MG control apparatus 10 with insufficient processing capacity is used, it is not suitable for the synchronous control in the low rotational speed range.

Figure 16A:
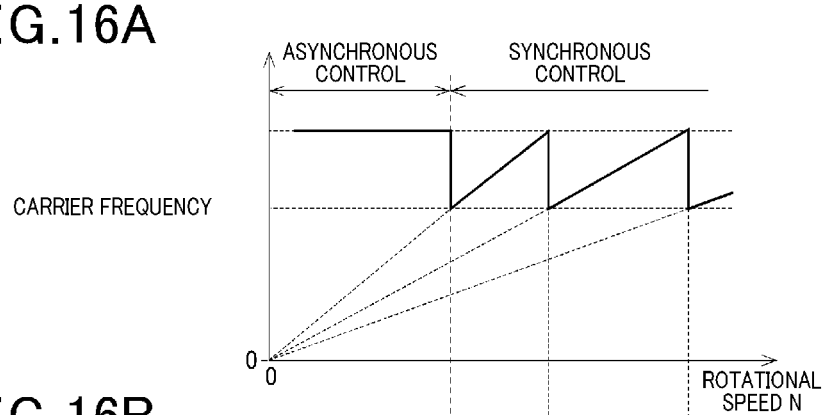
FIG. 16A is a graph of number of pulses versus carrier frequency in accordance with an article entitled "Power Electronics Circuit", Semiconductor Power Conversion System Investigation Expert Committee of the Institute of Electrical Engineers of Japan, Nov. 30, 2000, pp. 166-167.
Figure 16B:
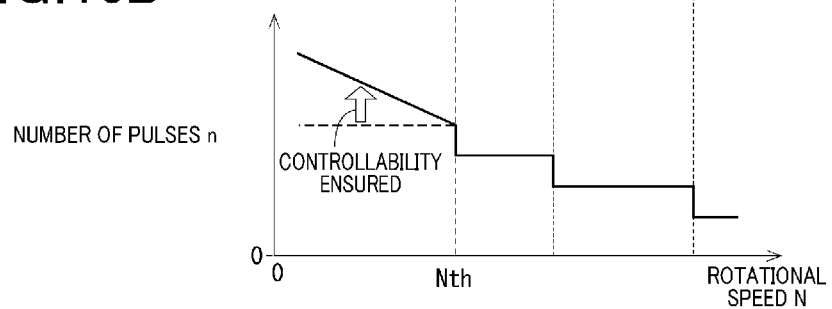
FIG. 16B is a graph of number of pulses versus rotational speed in accordance with the article entitled "Power Electronics Circuit" recited above.

For example, as shown in FIG. 16A, the article entitled "Power Electronics Circuit" recited above discloses a technique for using the synchronous pulse signal in the high rotational speed range and the asynchronous pulse signal in the low rotational speed range to drive the inverter. In FIG. 16B, in the low rotational speed and asynchronous control range, the per-cycle number of pulses n is increased with decreasing rotational speed N to ensure controllability.

For example, as shown in FIG. 16A, the article entitled "Power Electronics Circuit" recited above does not suggest a relationship between the modulation rate and synchronous/asynchronous control. Japanese Patent No. 5510444 discloses a technique for selecting between a synchronous pulse signal based on the pulse pattern and an asynchronous pulse signal based on the PWM signal depending on the modulation rate assuming that the PWM signal is the asynchronous pulse signal that is not synchronized with the electrical angle.

Figure 15A:
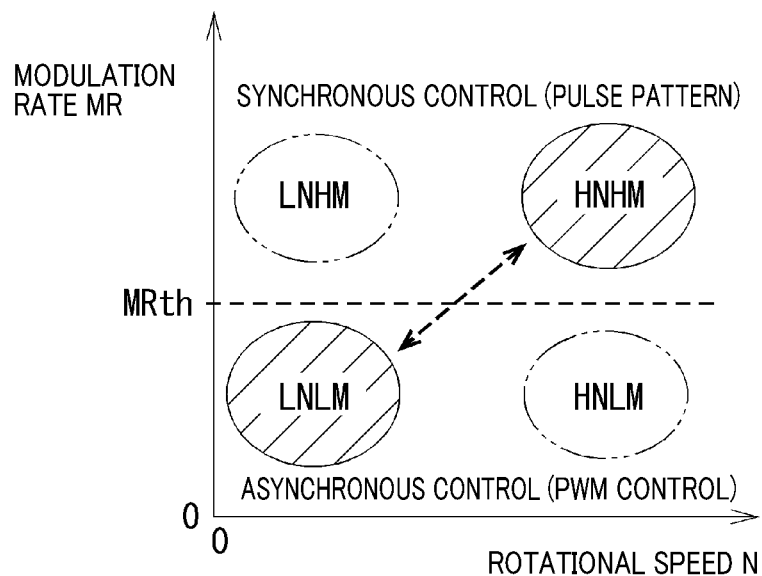
FIG. 15A is a graph of modulation rate versus number of pulses illustrating a synchronous/asynchronous control range in accordance with Japanese Patent No. 5510444.

Preferably, combining these findings of the article entitled "Power Electronics Circuit" recited above and Japanese Patent No. 5510444, as shown in FIG. 15A, the synchronous control is employed in the high rotational speed and high modulation rate range (HNHM), and the asynchronous control is employed in the low rotational speed and low modulation rate range (LNLM). However, what control mode is optimal in each of the low rotational speed and high modulation rate range and the high rotational speed and low modulation rate range can not be determined only from the findings of the article entitled "Power Electronics Circuit" recited above and Japanese Patent No. 5510444.

To this end, the present embodiment provides a technique for the MG control apparatus 10 to properly select between the synchronous control mode and the asynchronous control mode over the entire rotational speed and modulation rate range.

The MG control apparatus 10 will focus on the per-cycle number of pulses n in the low rotational speed and high modulation rate range.

In the resent embodiment, for example, as shown in FIG. 6, pattern signals as a function of the modulation rate MR are pre-stored in the pattern map in the pattern signal generator 51 of the synchronous pulse signal generation circuit 501. According to such a pattern map, a pattern of a relatively large per-cycle number of pulses n (e.g., n=9) is set for a low modulation rate MR. The per-cycle number of pulses n is decreased with increasing modulation rate MR. A pattern of a smaller per-cycle number of pulses n (e.g., n=5) is set for a modulation rate MR in the middle range. A square wave pattern that is a pattern of a smallest per-cycle number of pulses n=1 is set for a highest modulation rate MR. Focusing on this relationship, the per-cycle number of pulses n is decreased in the high modulation rate range, which can suppress an increase in the processing load.

Figure 7A:
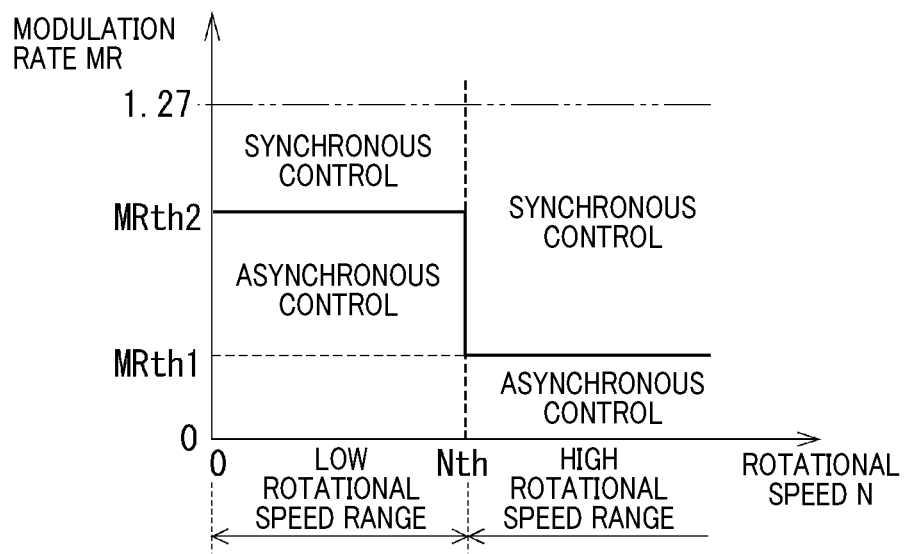
FIG. 7A is a graph of modulation rate versus rotational speed illustrating a synchronous/asynchronous control range.
Figure 7B:
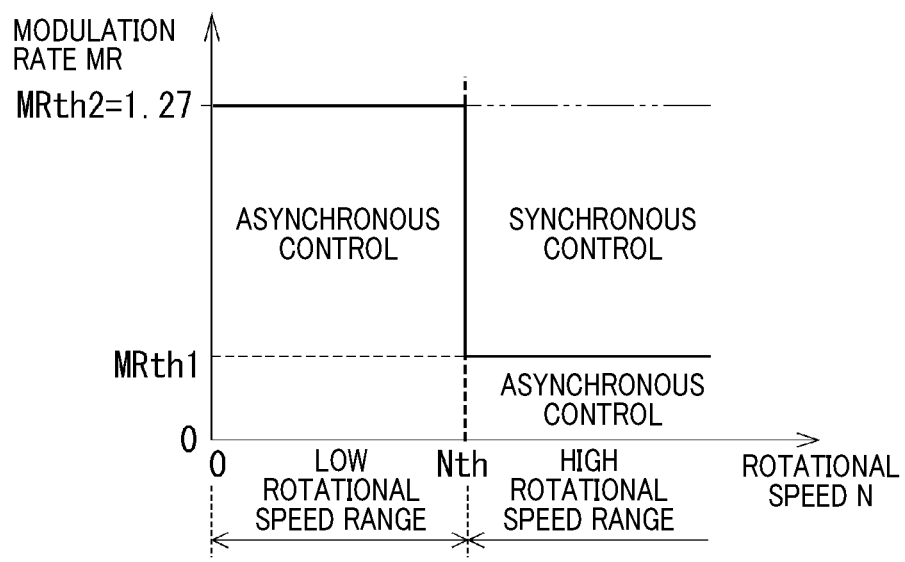
FIG. 7B is another graph of modulation rate versus rotational speed illustrating a synchronous/asynchronous control range.
Figure 8A:
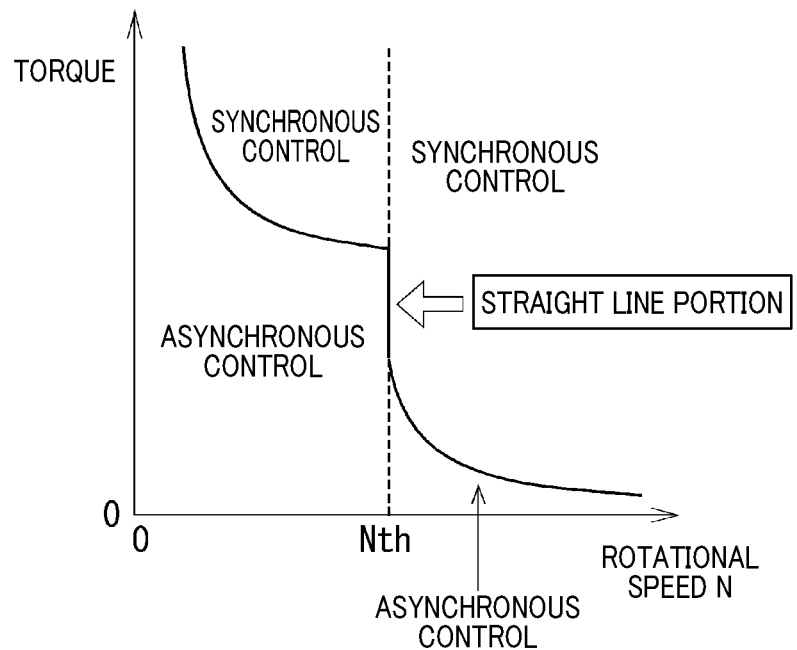
FIG. 8A is a graph of torque versus rotational speed illustrating a synchronous/asynchronous control range.
Figure 8B:
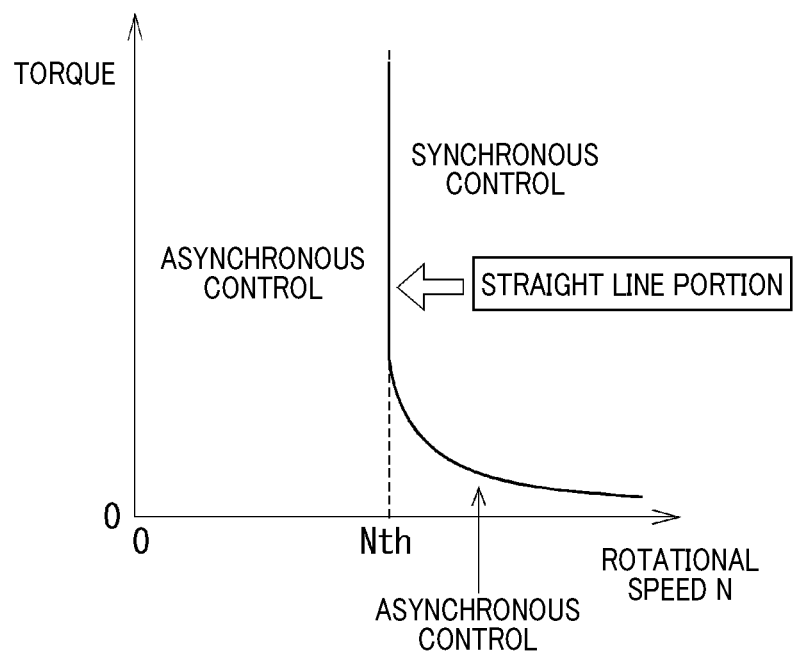
FIG. 8B is another graph of torque versus rotational speed illustrating a synchronous/asynchronous control range.

Subsequently, how to set a range where the synchronous/asynchronous control range is performed will now be described with reference to FIGS. 7A, 7B and FIGS. 8A, 8B. FIGS. 7A, 7B illustrate control ranges of the operating points of the MG 80 using a relationship between the rotational speed N and the modulation rate MR. FIGS. 8A, 8B illustrate control ranges of the operating points of the MG 80 using a relationship between the rotational speed N and the torque. FIGS. 7A and FIG. 8A illustrate a basic pattern of setting the control ranges in accordance with the present embodiment. FIG. 7B and FIG. 8B illustrate a special pattern when the modulation rate threshold MRth2 is set to a maximum value in the low rotational speed range.

As shown in FIG. 7A, a modulation rate threshold MRth1 is set in a high rotational speed range where the rotational speed N is equal to or greater than a rotational speed threshold Nth, and a modulation rate threshold MRth2 is set in a low rotational speed range where the rotational speed N is less than a rotational speed threshold Nth. The rotational speed threshold Nth and the modulation rate thresholds MRth1, MRth2 are all positive values. That is, the rotational speed N and the modulation rate MR are defined as being positive over the entire range considered in the present embodiment. The rotational speed N and the thresholds MRth1, MRth2 are not expected to be set to zero.

In the high rotational speed range, the synchronous control is performed in a range where the modulation rate MR is equal to or greater than the threshold MRth1, and the asynchronous control is performed in a range where the modulation rate MR is less than the threshold MRth1. In the low rotational speed range, the synchronous control is performed in a range where the modulation rate MR is equal to or greater than the threshold MRth2, and the asynchronous control is performed in a range where the modulation rate MR is less than the threshold MRth2. It should be noted that the modulation rate threshold MRth2 is set greater than the modulation rate threshold MRth1.

Figure 15B:
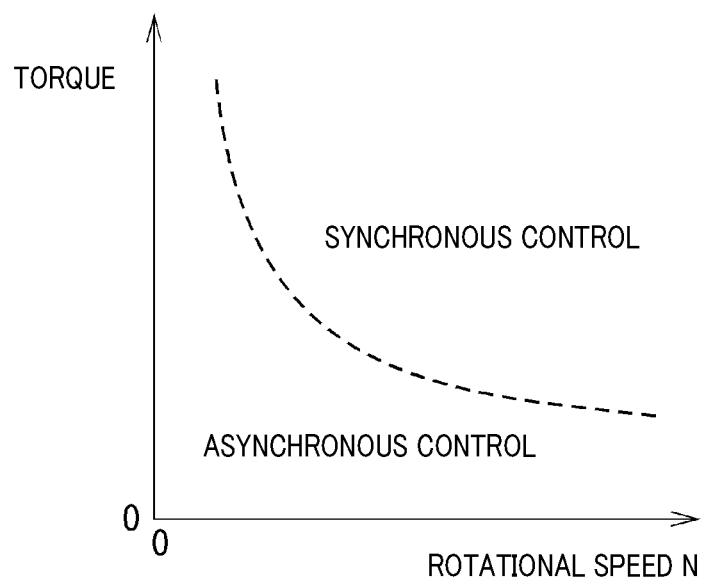
FIG. 15B is a graph of torque versus number of pulses illustrating a synchronous/asynchronous control.

In FIG. 8A illustrating a torque to rotational speed relationship, border lines respectively corresponding to the fixed modulation rate thresholds MRth1, MRth2 are represented by curves resembling inversely proportional lines. In contrast to the conventional technique where the modulation rate threshold MRth is set independently of the rotational speed (see FIG. 15B), it should be noted that, in the present embodiment, there is a straight line portion at the rotational speed threshold Nth.

In the present embodiment, making a difference in modulation rate threshold MRth between the low rotational speed range and the high rotational speed range allows priorities of reducing the vibration and noise and suppressing the processing load to be changed depending on the rotational speed N. That is, in the low rotational speed range where the increase in the processing load for the synchronous control is more likely to be a problem, the modulation rate threshold MRth2 is set relatively high to extend the asynchronous control range. In the high rotational speed range, the modulation rate threshold MRth1 is set relatively low to extend the synchronous control range where the vibration and noise can be advantageously reduced. With this configuration, throughout the operating range of the MG 80, reducing the vibration and noise can be balanced with suppressing the increase in the processing load.

The difference value between the modulation rate threshold MRth1 in the high rotational speed range and the modulation rate threshold MRth2 in the low rotational speed range can be determined depending on the balance between the required level for silence and the processing capacity of the apparatus, or on other factors. When there is a relatively large margin for the processing load, the difference between the modulation rate threshold MRth1 in the high rotational speed range and the modulation rate threshold MRth2 in the low rotational speed range may be set to a relatively small value. When there is no margin for the processing load, the difference between the modulation rate threshold MRth1 in the high rotational speed range and the modulation rate threshold MRth2 in the low rotational speed range may be set to a relatively large value.

As shown in FIG. 7B, the upper limit of the modulation rate threshold MRth2 in the low rotational speed range is 1.27, which corresponds to a square wave. There is substantially no possibility that the modulation rate exceeds such a modulation rate threshold MRth2. Therefore, as shown in FIGS. 7B and 8B, the asynchronous control will be performed regardless of the modulation rate MR in the low rotational speed range. The present embodiment includes such a case.

Figure 9:
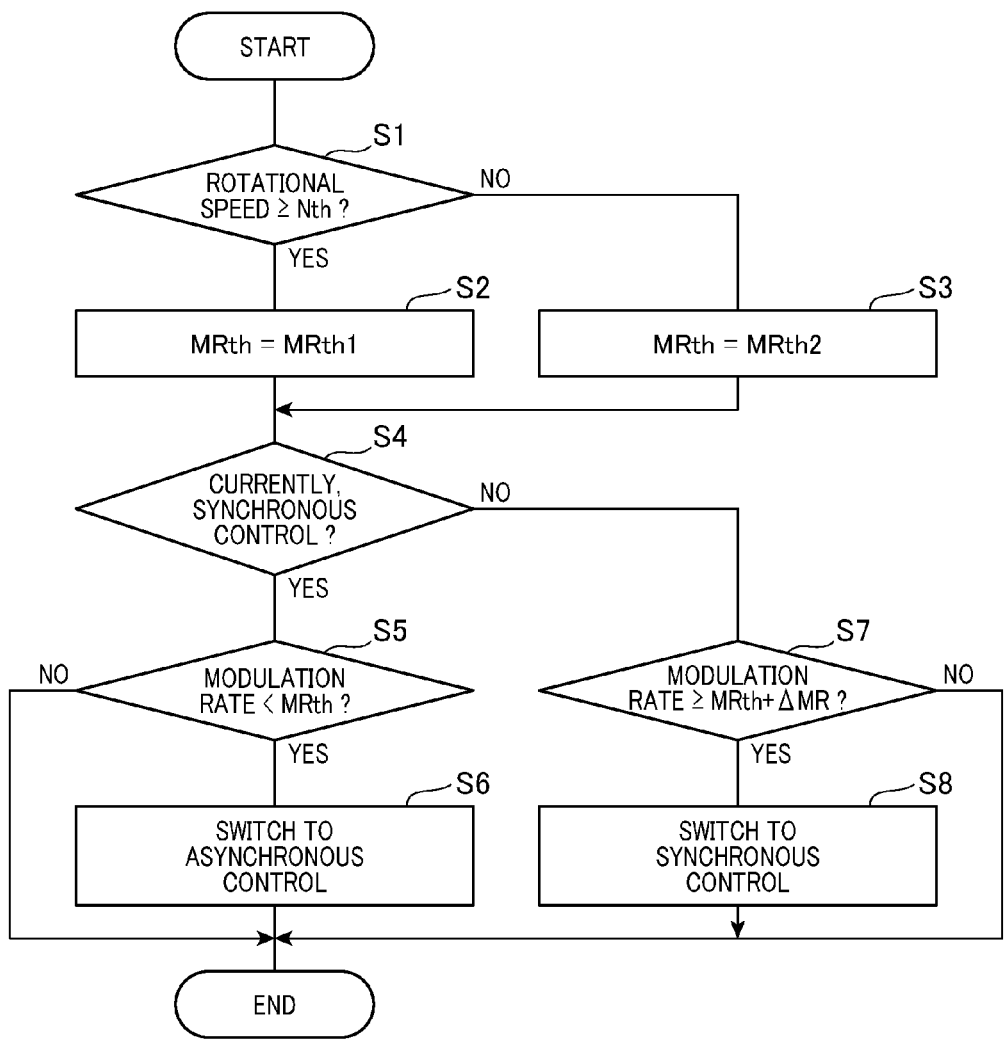
FIG. 9 is a flowchart of control mode switching determination processing.

Control mode switching determination processing performed in the control mode switching determiner 71 will now be described with respect to a flowchart of FIG. 9 and FIGS. 10A, 10B.

In step S1, the control mode switching determiner 71 determines whether or not the rotational speed of the MG 80 is equal to or greater than the rotational speed threshold Nth. If the rotational speed of the MG 80 is equal to or greater than the rotational speed threshold Nth (step S1; YES), then in step S2 the control mode switching determiner 71 selects the modulation rate threshold MRth1 as the modulation rate threshold in the high rotational speed range. If the rotational speed of the MG 80 is less than the rotational speed threshold Nth (step S1; NO), then in step S3 the control mode switching determiner 71 selects the modulation rate threshold MRth2 as the modulation rate threshold in the low rotational speed range.

Figure 10A:
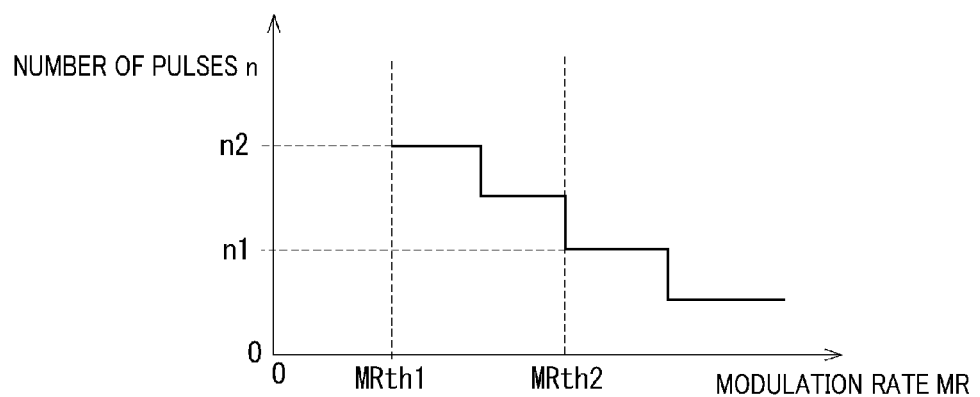
FIG. 10A is a graph of number of pulses versus modulation rate.

As shown in FIG. 10A, the per-cycle number of pulses n decrease in steps with increasing modulation rate MR. The number of pulses n that can be processed in one control cycle is calculated from the processing capacity and the control cycle of the inverter controller. Based on a result of calculation, values of the modulation rate threshold MRth1, MRth2 are determined.

In step S4, the control mode switching determiner 71 determines whether the current control mode is the synchronous control mode or the asynchronous control mode. If the current control mode is the synchronous control mode (step S4; YES), the process flow proceeds to step S5. If the current control mode is the asynchronous control mode (step S4; NO), the process flow proceeds to step S7.

In step S5, the control mode switching determiner 71 determines whether or not the modulation rate MR is less than the modulation rate threshold MRth. If the modulation rate MR is less than the modulation rate threshold MRth (step S5; YES), then in step S6 the control mode switching determiner 71 switches from the synchronous control mode to the asynchronous control mode. If the modulation rate MR is equal to or greater than the modulation rate threshold MRth (step S5; NO), then the control mode switching determiner 71 retains the current synchronous control mode.

Figure 10B:
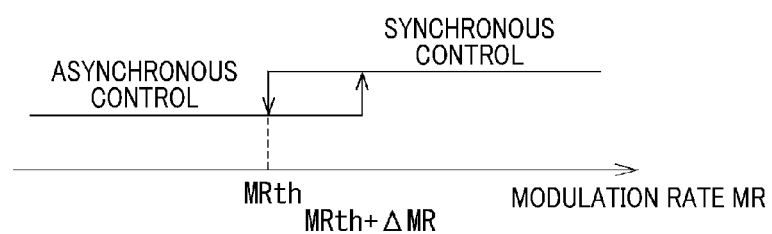
FIG. 10B is an example of hysteresis in control mode switching.

As shown in FIG. 10B, hysteresis is built to prevent hunting on control mode switching. When switching from the asynchronous control mode to the synchronous control mode, MRth plus a predetermined margin $\Delta$MR, that is, MRth+$\Delta$MR is used as the modulation rate threshold.

If in step S7 it is determined that the modulation rate MR is equal to greater than MRth+$\Delta$MR (step S7; YES), then in step S8 the control mode switching determiner 71 switches from the asynchronous control mode to the synchronous control mode. If in step S7 it is determined that the modulation rate MR is less than MRth+$\Delta$MR (step S7; NO), then in step S8 the control mode switching determiner 71 retains the current asynchronous control mode.

The flowchart of the control mode switching determination processing may also be used in the second embodiment.

In this way, the MG control apparatus 10 of the present embodiment sets the modulation rate threshold MRth2 in the low rotational speed range to be greater than the modulation rate threshold MRth1 in the high rotational speed range.

Unfortunately, in the low rotational speed range, increasing the per-cycle number of pulses n to ensure controllability may lead to an increase in the processing load. However, in a range where the modulation rate MR takes a relatively large value, the number of pulses n can be decreased. Therefore, the modulation rate threshold MRth2 is set to a larger value in the low rotational speed range than in the high rotational speed range, whereby the vibration and noise can be reduced by the synchronous control in part of the high modulation rate range while putting emphases on the effect of the asynchronous control suppressing an increase in the processing load.

Meanwhile, the modulation rate threshold MRth is set to a smaller value in the high rotational speed range than in the low rotational speed range, whereby the synchronous control range where the vibration and noise can be advantageously reduced can be extended as broadly as possible.

Thus, in the present embodiment, over the whole range of the rotational speed and the modulation rate of the MG 80, reducing the vibration and noise can be balanced with suppressing the increase in the processing load.

Second Embodiment

Figure 11:
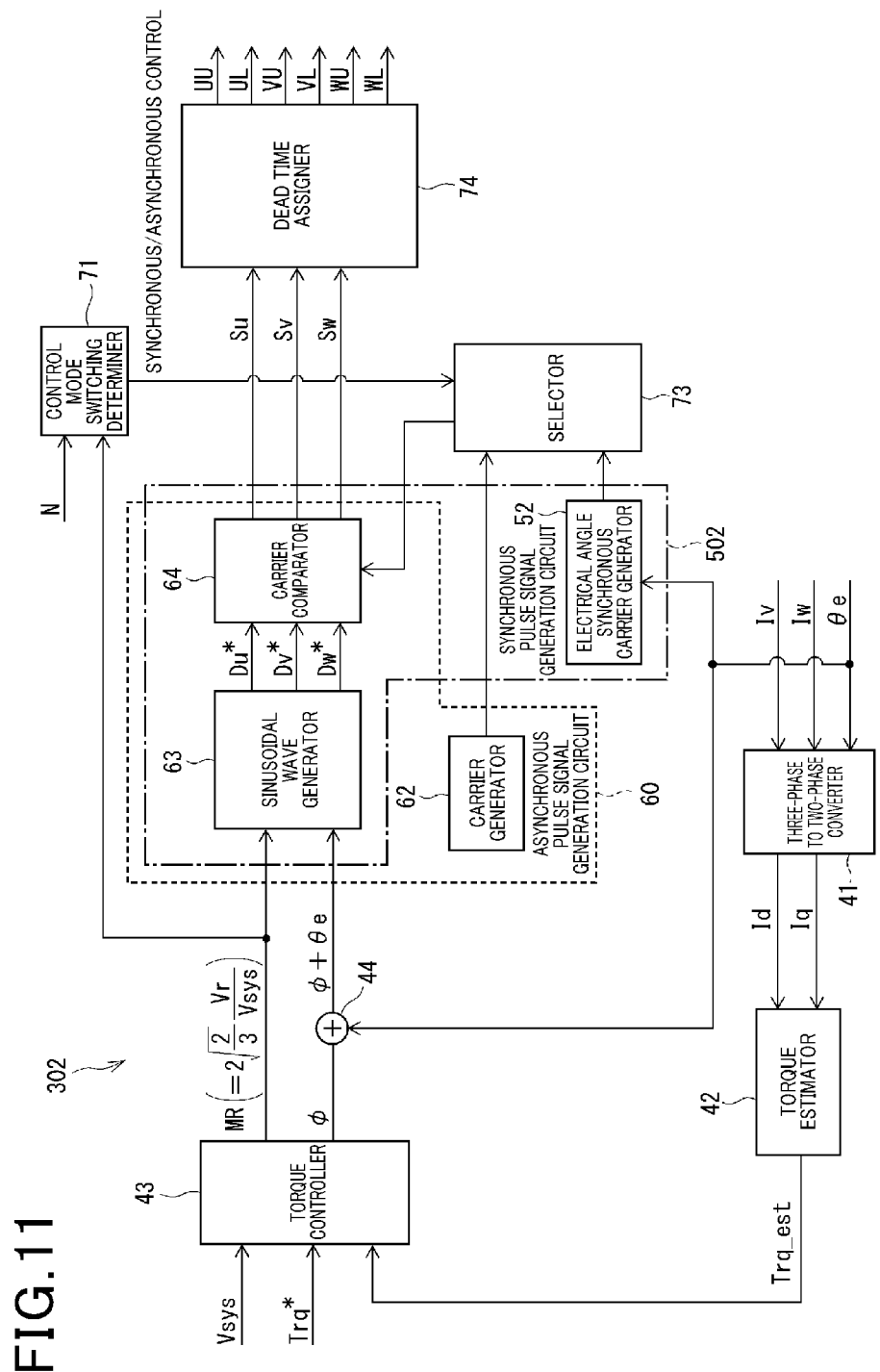
FIG. 11 is a control block diagram of the inverter controller of the second embodiment.
Figure 12:
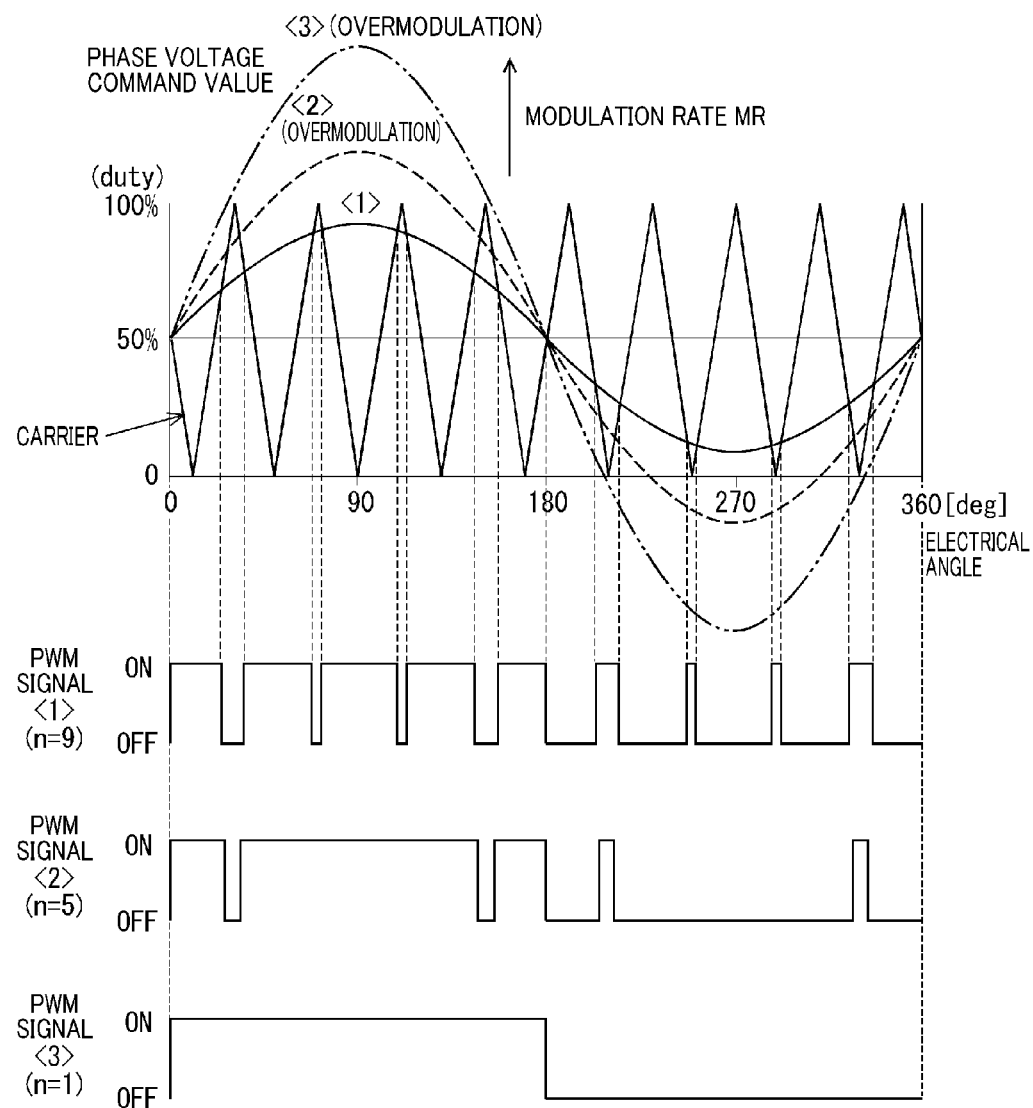
FIG. 12 is an example of relationship between the modulation rate and the number of pulses in the PWM control.

A second embodiment will now be described with reference to FIGS. 11, 12. FIG. 11 illustrates a block diagram of the inverter controller corresponding to FIG. 2A of the first embodiment. FIG. 12 illustrates a relationship between the modulation rate MR and the pulse number n corresponding to FIG. 6.

As shown in FIG. 11, the second embodiment is different from the first embodiment in that the synchronous pulse generation circuit 502 of the inverter controller 302 (identified with the inverter controller 30) of the second embodiment is different in configuration from the synchronous pulse generation circuit 501 of the inverter controller 301 of the inverter controller 301 of the first embodiment. That is, in the inverter controller 302, the synchronous pulse generation circuit 502 and the asynchronous pulse generation circuit 60 includes the sinusoidal wave generator 63 and the carrier comparator 64 in common. The synchronous pulse generation circuit 502 further includes a synchronous carrier generator 52. The asynchronous pulse generation circuit 60 further includes the carrier generator 62.

The synchronous carrier generator 52 of the synchronous pulse generation circuit 502 acquires an electrical angle θe to generate a synchronous carrier having cycles synchronized with the electrical angle θe. The carrier generator 62 of the asynchronous pulse generation circuit 60 generates an asynchronous carrier having a cycle independent of the electrical angle θe.

The synchronous carrier generated by the synchronous carrier generator 52 and the asynchronous carrier generated by the carrier generator 62 are inputted into the selector 73. The selector 73 selects either one of the synchronous carrier generated by the synchronous carrier generator 52 and the asynchronous carrier generated by the carrier generator 62 in accordance with a result of determination by the control mode switching determiner 71 to output the selected one of the carriers to the carrier comparator 64.

Upon receipt of the synchronous carrier, the carrier comparator 64 functions as a component in the synchronous pulse generation circuit 502 to generate a synchronous pulse signal. Upon receipt of the asynchronous carrier, the carrier comparator 64 functions as a component in the asynchronous pulse generation circuit 60 to generate an asynchronous pulse signal. Drive signals Su, Sv, Sw generated by the carrier comparator 64 are output to the dead time assigner 74.

FIG. 12 illustrates a relationship between the modulation rate MR and the number of pulses n in the PWM control. The modulation rate MR of the phase voltage increases in the order of <1>, <2>, and <3>. In the cases <2> and <3> where the maximum amplitude exceeds the duty range of 0 to 100%, overmodulation occurs. The case <3> is shown for illustration, but not used practically.

In the case <1>, the phase voltage intersects the carrier every cycle of the carrier. Therefore, the per-cycle number of pulses n is equal to the carrier frequency. In the case of FIG. 12, n=9. In the case <2>, the phase voltage does not intersect the carrier every cycle, so that the per-cycle number of pulses n decreases to n=5 as compared with the case <1>. In a special case <3> where the phase voltage no longer intersects the carrier, the per-cycle number of pulses n decreases to one (i.e., n=1), which corresponds to a square wave.

Therefore, as in the description about FIG. 6 of the first embodiment, also in the synchronous control, the number of pulses decreases with increasing modulation rate MR, which can suppress an increase in the processing load. Hence, also in the low rotational speed range, in a range where the modulation rate MR is greater than the modulation rate threshold MRth2, driving the inverter with the synchronous pulse signal generated using the synchronous carrier can reduce the vibration and noise without increasing the processing load.

Third Embodiment

A third embodiment of the present invention will now be described with reference to a flowchart of FIG. 13 and FIGS. 14A, 14B. The inverter controller 30 of the third embodiment is similar in configuration to each of the inverter controller 301 of the first embodiment and the inverter controller 302 of the second embodiment, but is different from them in that the control mode switching determiner 71 includes an additional function.

For example, in the MG drive system 90 of the vehicle, reducing the vibration and noise is more prioritized over suppressing the increase in the processing load when demands imposed on silence are particularly great, such as when the vehicle is parked or during nighttime, than usual. When to switch from a normal mode to the silent mode is determined by an in-vehicle high-level control circuit. Then, in step S11 of FIG. 13, the control mode switching determiner 71 of the MG control apparatus 10 is instructed by the high-level control circuit to switch from the normal mode to the silent mode.

In the silent mode, the control mode switching determiner 71 increases a pulse density that is the number of pulses per unit time in step S12 to reduce the vibration and noise. In the PWM control other than in the case of the overmodulation, the pulse density can be replaced with the carrier frequency.

Figure 14A:
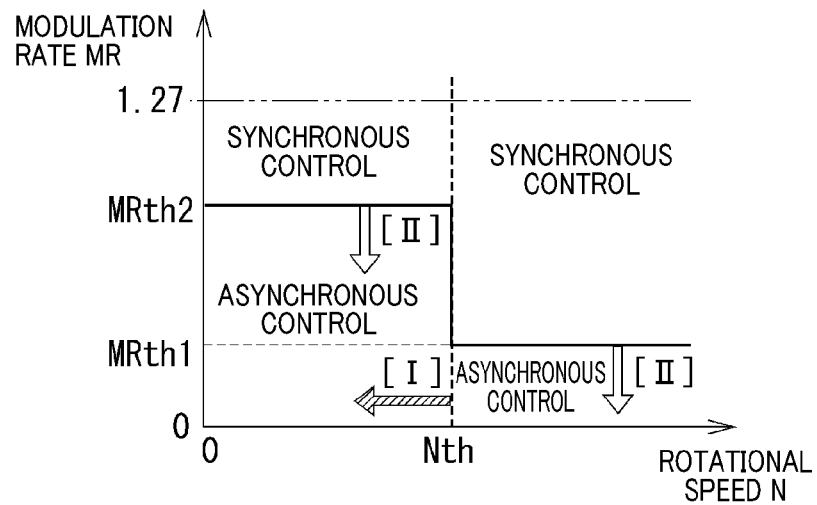
FIG. 14A is a graph of modulation rate versus rotational speed illustrating modification of parameters in the silent mode.

When the pulse density is increased, in the asynchronous control, the phase current is likely to be disturbed due to changes in actual pulses. Therefore, in step S13, to extend the synchronous control range, the control mode switching determiner 71 modifies the parameters by at least one of:

[I] lowering the rotational speed threshold Nth (see FIG. 14A);

[II] lowering the modulation rate thresholds MRth1, MRth2 (see FIGS. 14A, 14B); and

Figure 14B:
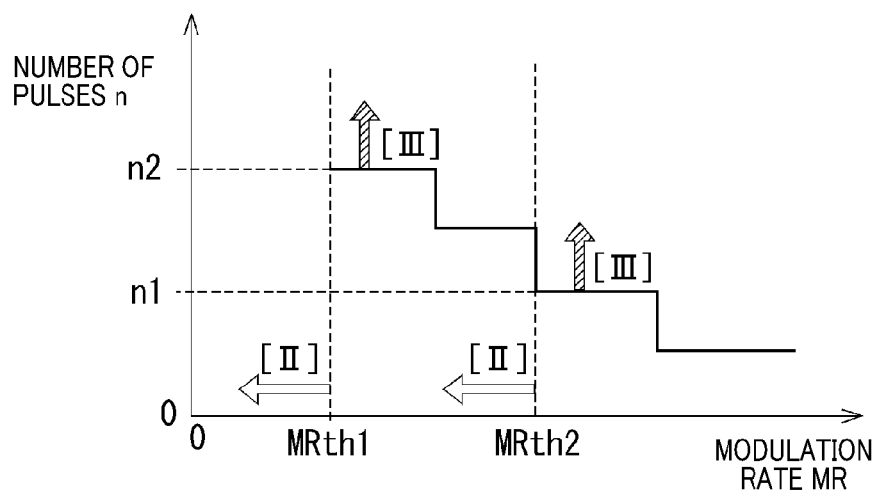
FIG. 14B is a graph of number of pulses versus modulation rate illustrating modification of parameters in the silent mode.

[III] increasing the per-cycle number of pulses n1, n2 corresponding to the modulation rate thresholds MRth1, MRth2 (see FIG. 14B).

Since the synchronous control range is extended by at least one of these operations, reducing the vibration and noise can be prioritized over suppressing the increase in the processing load over a wide range of operating points. Thus, in the third embodiment, the balance between the synchronous control range and the asynchronous control range is adjusted as appropriate depending on an environment in which the MG control apparatus 10 is used.

Modifications (a) In each of the first to third embodiments, two rotational speed ranges, that is, the low rotational speed range and the high rotational speed range, are provided. Alternatively, three or more rotational speed ranges may be provided, where the modulation rate threshold MRth may be increased in steps from the high rotational speed range to the low rotational speed range.

(b) The systems that the control apparatus of the AC motor of the present invention is applicable to may include, but are not limited to an MG system for a hybrid vehicle or an electric vehicle, and any AC motor drive systems such that reducing the vibration and noise and/or suppressing the increase in the processing load of the controller could be challenging.

As described above, the present invention is not limited to the above embodiments, and may be implemented in various forms without departing from the scope claimed for the invention.

What is claimed is:

1. A control apparatus for an alternating current (AC) motor, comprising:
   an inverter configured to convert direct current (DC) power input from a power source into alternating current (AC) power by driving a plurality of switching elements to supply the AC power to the AC motor;
   a controller configured to calculate a modulation rate that is based on a ratio of an amplitude of a voltage vector commanded to the inverter to an inverter voltage, and also calculate a phase of the voltage vector;
   a synchronous pulse generation circuit configured to generate a synchronous pulse signal synchronized with an electrical angle of the AC motor as a drive signal for driving the inverter depending on the modulation rate, the phase of the voltage vector, and the electrical angle of the AC motor;
   an asynchronous pulse generation circuit configured to generate an asynchronous pulse signal having a cycle independent of the signal electrical angle, as the drive signal;
   a control mode switching determiner configured to compare the modulation rate with a modulation rate threshold that is a positive value, and configured to select between a synchronous control mode to perform synchronous control in a range where the modulation rate is equal to or greater than the modulation rate threshold and an asynchronous control mode to perform asynchronous control in a range where the modulation rate is less than the modulation rate threshold, the control mode switching determiner being further configured to use different values of the modulation rate threshold in a low rotational speed range and a high rotational speed range such that the modulation rate threshold in the low rotational speed range is greater than the modulation rate threshold in the high rotational speed range, the low rotational speed range being a rotational speed range in which an absolute value of a rotational speed of the AC motor is less than a rotational speed threshold that is a positive value, the high rotational speed range being a rotational speed range in which the absolute value of the rotational speed of the AC motor is equal to or greater than the rotational speed threshold; and
   a selector configured to select between outputting the synchronous pulse signal and outputting the asynchronous pulse signal according to a result of determination by the control mode switching determiner.

2. The apparatus according to claim 1, wherein the synchronous pulse generation circuit is configured to select one of a plurality of pre-stored pulse patterns, and generate the synchronous pulse signal according to the selected pulse pattern.

3. The apparatus according to claim 1, wherein the synchronous pulse generation circuit is configured to, in PWM control where the drive signal is generated based on comparison of a phase voltage that is calculated based on outputs of the controller with a carrier, generate the synchronous pulse signal using the carrier having a cycle synchronized with the electrical angle of the AC motor.

4. The apparatus according to claim 1, wherein the control mode switching determiner is configured to, in a mode to extend a range where the synchronous control is performed, lower the rotational speed threshold, lower the modulation rate thresholds, or increase the number of pulses in one electrical cycle.

5. The apparatus according to claim 1, wherein the control mode switcher is configured to, if the modulation rate exceeds the modulation rate threshold plus a predetermined hysteresis margin, then switch from the asynchronous control mode to the synchronous control mode, and if the modulation rate decreases to below the modulation rate threshold, then switch from the synchronous control mode to the asynchronous control mode.

6. A control apparatus for an alternating current (AC) motor, comprising:
   an inverter configured to convert direct current (DC) power input from a power source into alternating current (AC) power by driving a plurality of switching elements to supply the AC power to the AC motor;
   a controller configured to calculate a modulation rate that is based on a ratio of an amplitude of a voltage vector commanded to the inverter to an inverter voltage, and also calculate a phase of the voltage vector;
   a synchronous pulse generation circuit configured to generate a synchronous pulse signal synchronized with an electrical angle of the AC motor as a drive signal for driving the inverter depending on the modulation rate, the phase of the voltage vector, and the electrical angle of the AC motor;
   an asynchronous pulse generation circuit configured to generate an asynchronous pulse signal having a cycle independent of the signal electrical angle, as the drive signal;
   a control mode switching determiner configured to compare the modulation rate with a modulation rate threshold that is a positive value, and configured to select between a synchronous control mode to perform synchronous control in a range where the modulation rate is equal to or greater than the modulation rate threshold and an asynchronous control mode to perform asynchronous control in a range where the modulation rate is less than the modulation rate threshold, the control mode switching determiner being further configured to use different values of the modulation rate threshold in a low rotational speed range and a high rotational speed range such that the modulation rate threshold in the low rotational speed range is greater than the modulation rate threshold in the high rotational speed range, the low rotational speed range being a rotational speed range in which an absolute value of a rotational speed of the AC motor is less than a rotational speed threshold that is a positive value, the high rotational speed range being a rotational speed range in which the absolute value of the rotational speed of the AC motor is equal to or greater than the rotational speed threshold; and a selector configured to select between generating the synchronous pulse signal and generating the asynchronous pulse signal according to a result of determination by the control mode switching determiner.

7. The apparatus according to claim 6, wherein the synchronous pulse generation circuit is configured to select one of a plurality of pre-stored pulse patterns, and generate the synchronous pulse signal according to the selected pulse pattern.

8. The apparatus according to claim 6, wherein the synchronous pulse generation circuit is configured to, in PWM control where the drive signal is generated based on comparison of a phase voltage that is calculated based on outputs of the controller with a carrier, generate the synchronous pulse signal using the carrier having a cycle synchronized with the electrical angle of the AC motor.

9. The apparatus according to claim 6, wherein the control mode switching determiner is configured to, in a mode to extend a range where the synchronous control is performed, lower the rotational speed threshold, lower the modulation rate thresholds, or increase the number of pulses in one electrical cycle.

10. The apparatus according to claim 6, wherein the control mode switcher is configured to, if the modulation rate exceeds the modulation rate threshold plus a predetermined hysteresis margin, then switch from the asynchronous control mode to the synchronous control mode, and if the modulation rate decreases to below the modulation rate threshold, then switch from the synchronous control mode to the asynchronous control mode.

* * * * *